(12) United States Patent
Furihata et al.

(10) Patent No.: US 9,739,604 B2
(45) Date of Patent: Aug. 22, 2017

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventors: Hisayoshi Furihata, Tokyo (JP); Kazuhiko Kobayashi, Yokohama (JP); Nozomu Kasuya, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 69 days.

(21) Appl. No.: 14/849,422

(22) Filed: Sep. 9, 2015

(65) Prior Publication Data

US 2016/0069669 A1   Mar. 10, 2016

(30) Foreign Application Priority Data

Sep. 10, 2014   (JP) .................................. 2014-184466

(51) Int. Cl.
| | |
|---|---|
| *G01B 11/24* | (2006.01) |
| *G01B 11/30* | (2006.01) |
| *G01B 11/25* | (2006.01) |
| *G06K 9/00* | (2006.01) |
| *G06T 7/521* | (2017.01) |

(52) U.S. Cl.
CPC ...... *G01B 11/2536* (2013.01); *G06K 9/00201* (2013.01); *G06T 7/521* (2017.01)

(58) Field of Classification Search
CPC .............................. G01B 11/24; G01B 11/30
USPC ....................................................... 356/610
See application file for complete search history.

(56) References Cited

U.S. PATENT DOCUMENTS 4,007,440 A * 2/1977 Kono .................. G06K 9/4647
382/206
2010/0118123 A1    5/2010 Freedman et al.

FOREIGN PATENT DOCUMENTS

JP              1-274007 A      11/1989

OTHER PUBLICATIONS

Makoto Kimura et al., "Projector Calibration using Arbitrary Planes and Calibrated Camera", Computer Vision and Pattern Recognition,CVPR, 2007, 2 pages.

(Continued)

*Primary Examiner* — Roy M Punnoose
(74) *Attorney, Agent, or Firm* — Canon USA, Inc., IP Division

(57) ABSTRACT

To measure a three-dimensional shape of a measurement target object at high speed, an information processing method includes acquiring a captured image captured by an imaging apparatus in a state where a pattern is projected onto the measurement target object, the pattern including a plurality of lines, identification information arranged on or between the lines to identify the lines, and a feature arranged between a plurality of the lines, identifying each line included in the captured image by acquiring a correspondence between each line included in the projected pattern and each line included in the captured image, determining a second region in the pattern corresponding to a first region between the lines in the captured image, and deriving a distance of the measurement target object by acquiring a correspondence between the first region and the determined second region.

24 Claims, 7 Drawing Sheets

(56) References Cited

OTHER PUBLICATIONS

Roger Y. Tsai, "A Versatile Camera Calibration Technique for High-Accuracy 3D Machine Vision Metrology Using Off-the-Shelf TV Cameras and Lenses", IEEE Journal of Robotics and Automation, vol. RA-3, No. 4, Aug. 1987, pp. 323-344.

* cited by examiner

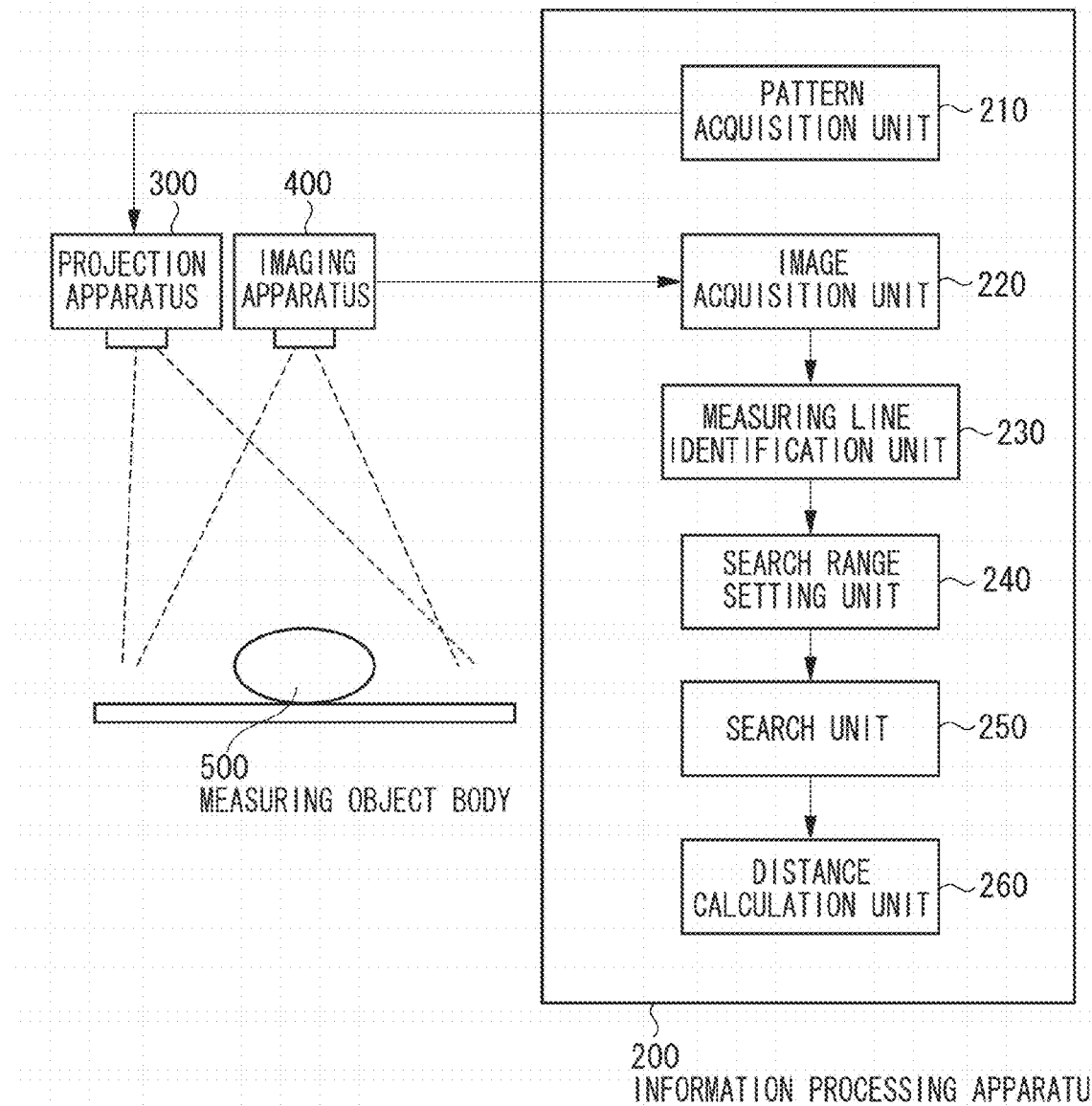

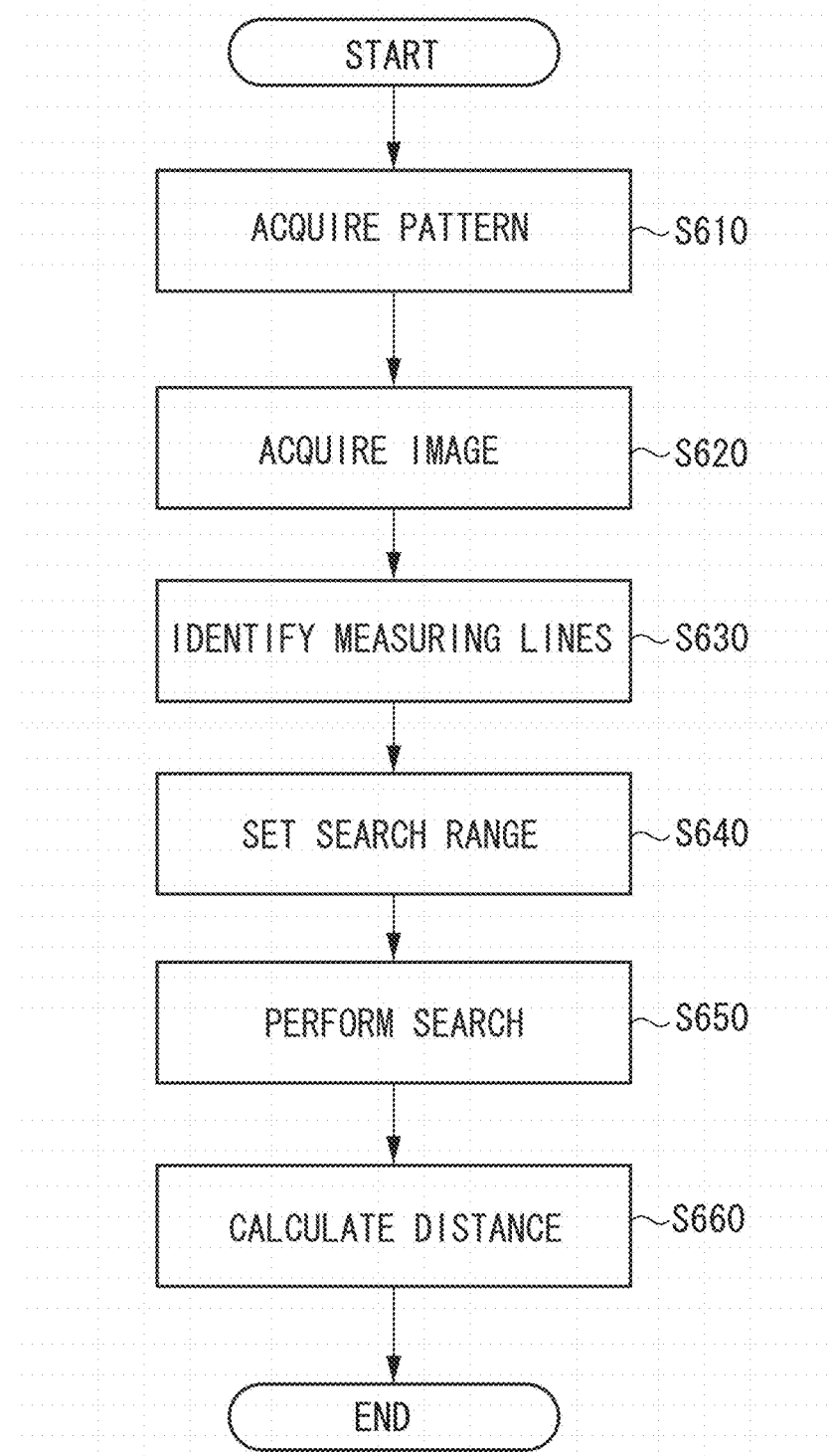

INFORMATION PROCESSING APPARATUS, INFORMATION PROCESSING METHOD, AND STORAGE MEDIUM

BACKGROUND OF THE INVENTION

Field of the Invention

The present disclosure generally relates to information processing and, more particularly, to an information processing apparatus, information processing method, storage medium, and to a technique for measuring a three-dimensional shape of a surface of a measurement target object based on a captured image of the measurement target object onto which a pattern is projected.

Description of the Related Art

As discussed in U.S. Patent Application Publication No. 2010/0118123 A1, there has been a conventional method for projecting a pattern including randomly generated dot features and measuring the distance based on a captured image of the pattern. This technique acquires the correspondence between a region including dots included in the captured image and a region including dots included in the projected pattern, and calculates the distance based on the triangulation principle. The technique performs calculation for acquiring the correspondence through matching processing. More specifically, the technique searches for a region corresponding to a region including dots included in the captured image, from within the projected pattern.

However, in the above-described calculation for acquiring the correspondence, the processing time increases with increasing width of a search range subjected to search. The technique discussed in U.S. Patent Application Publication No. 2010/0118123 A1 has a problem of consuming processing time because no measures have been taken for this problem.

SUMMARY OF THE INVENTION

According to an aspect of the present disclosure, an information processing apparatus includes an acquisition unit configured to acquire a captured image captured by an imaging apparatus in a state where a pattern is projected onto a measurement target object, the pattern including a plurality of lines, identification information arranged on or between the lines to identify the lines, and a feature arranged between the plurality of lines, an identification unit configured to identify each line included in the captured image by acquiring a correspondence between each line included in the projected pattern and each line included in the captured image, based on the identification information included in the captured image, a determination unit configured to determine a second region in the pattern corresponding to a first region between the lines in the captured image based on a result of the identification by the identification unit, and a derivation unit configured to derive a distance of the measurement target object by acquiring a correspondence between the first region and the second region determined by the determination unit.

According to the present disclosure, a three-dimensional shape of a measurement target object can be measured at high speed.

Further features of the present disclosure will become apparent from the following description of exemplary embodiments with reference to the attached drawings.

BRIEF DESCRIPTION OF THE DRAWINGS

FIG. 2 illustrates a configuration of the information processing apparatus according to the first exemplary embodiment.

FIG. 3 is a flowchart illustrating information processing according to the first exemplary embodiment.

DESCRIPTION OF THE EMBODIMENTS

Prior to descriptions of each exemplary embodiment according to the present disclosure, a hardware configuration of an information processing apparatus according to each exemplary embodiment will be described below with reference to FIG. 7.

Figure 7:
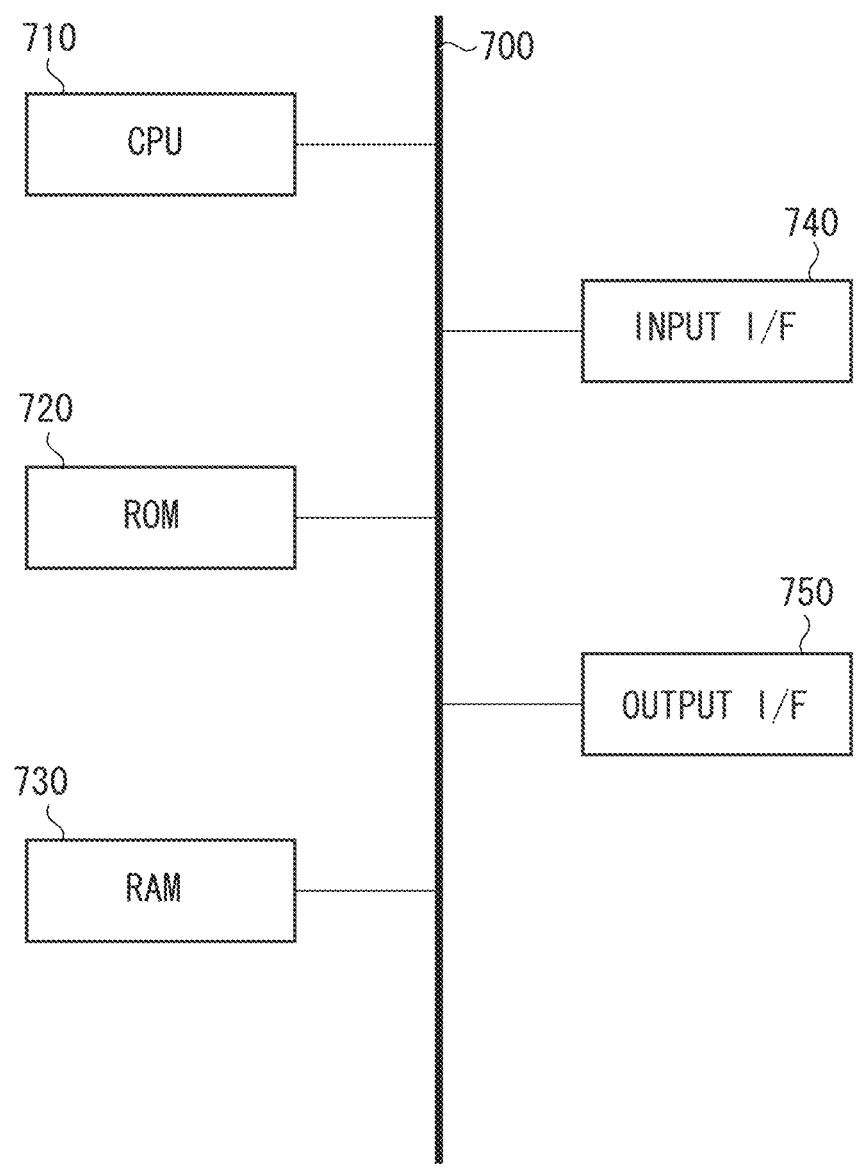
FIG. 7 illustrates a hardware configuration of the information processing apparatus according to the present disclosure.

FIG. 7 illustrates a hardware configuration of an information processing apparatus according to the present exemplary embodiment. Referring to FIG. 7, a central processing unit (CPU) 710 controls each device connected via a bus 700. The CPU 710 reads and executes processing steps and programs stored in a read only memory (ROM) 720. An operating system (OS), and processing programs and device drivers related to the present exemplary embodiment are stored in the ROM 720. They are temporarily stored in a random access memory (RAM) 730 and are suitably executed by the CPU 710. An input interface (I/F) 740 inputs an input signal from an external apparatus (a display apparatus, an operation apparatus, etc.) in a format processable by the information processing apparatus. An output I/F 750 outputs an output signal to an external apparatus (display apparatus) in a format processable by the display apparatus. As used herein, the term "unit" generally refers to any combination of software, firmware, hardware, or other component, such as circuitry, that is used to effectuate a purpose.

The above-described functional units are implemented when the CPU 710 loads a program stored in the ROM 720 into the RAM 730 and executes processing of each flowchart (described below). For example, when configuring hardware as substitution of software processing by using the CPU 710, it is necessary to configure calculation units and circuits supporting processing of each functional unit (described below).

In a first exemplary embodiment, a method for measuring a three-dimensional shape of a measurement target object at high speed will be described below.

Figure 1:
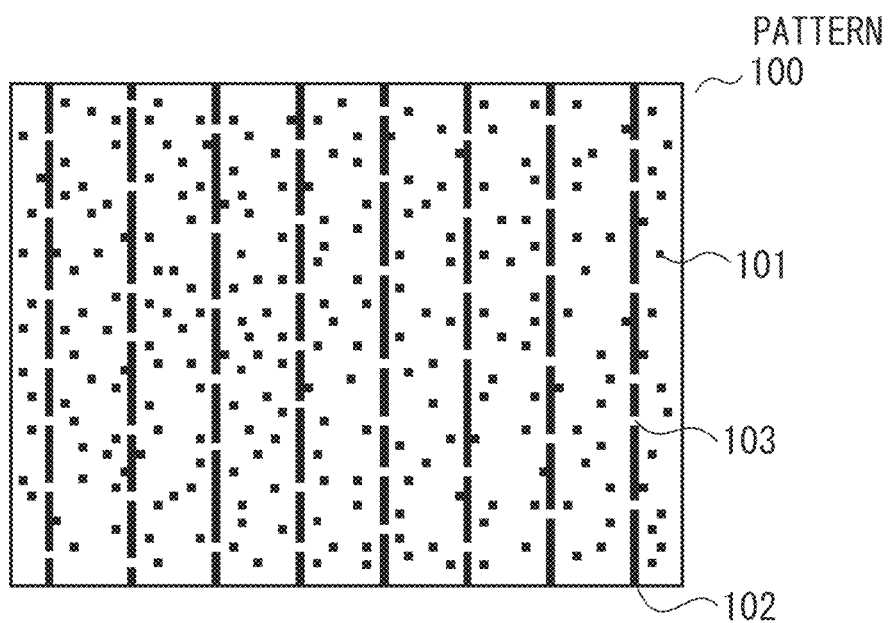
FIG. 1 illustrates a pattern acquired by an information processing apparatus according to a first exemplary embodiment.

Referring to FIG. 1, a pattern 100 to be used in the present exemplary embodiment includes at least one dot 101 as a feature element and at least one line 102 (hereinafter each line is referred to as a measuring line). The measuring line 102 has identification information 103 for identifying which measuring line on the pattern 100 is projected onto each measuring line observed on an image. In the present exemplary embodiment, the identification information 103 is a plurality of breaks on the measuring line 102.

In the present exemplary embodiment, a measuring line on an image subjected to measurement target object observation are identified based on identification information. Then, based on the result of the measuring line identification, the time to perform a search is reduced by narrowing a search range for acquiring the correspondence between a region (first region) including features in the image and a region (second region) including features in a pattern. In the present specification, a region refers to not only a pixel region formed of a plurality of pixels but also a 1-pixel region in an image.

FIG. 2 illustrates a configuration of an information processing apparatus 200 according to the present exemplary embodiment. The information processing apparatus 200 according to the present exemplary embodiment includes a projection apparatus 300, an imaging apparatus 400, a pattern acquisition unit 210, an image acquisition unit 220, a measuring line identification unit 230, a search range setting unit 240, a search unit 250, and a distance calculation unit 260. FIG. 2 also illustrates a measurement target object 500.

The projection apparatus 300 is a projector for projecting an image of the pattern 100 with light. Internal parameter information including a focal length, a principal point position, and a lens distortion parameter of the projection apparatus 300, and information about relative position and orientation of the projection apparatus 300 with respect to the imaging apparatus 400 are calibrated in advance. The method for calibrating these pieces of information is a known method. For example, the information can be calibrated by using a method discussed in the following document. M. Kimura, "Projector Calibration using Arbitrary Planes and Calibrated Camera" Computer Vision and Pattern Recognition, CVPR, 2007.

The imaging apparatus 400 is a camera for capturing a grayscale image. Internal parameter information including a focal length, a principal point position, and a lens distortion parameter of the imaging apparatus 400 is calibrated in advance. The method for calibrating the information is a known method. For example, the information can be calibrated by using a method discussed in the following document. R. Y. Tsai, "A versatile camera calibration technique for high-accuracy 3D machine vision metrology using off-the-shelf TV cameras and lenses" Institute of Electrical and Electronics Engineers (IEEE) Journal of Robotics and Automation, Vol. RA-3, No. 4, 1987.

The pattern acquisition unit 210 acquires an image of the pattern 100 to be projected onto the measurement target object 500. A pattern acquired by the pattern acquisition unit 210 is a two-dimensional image including a plurality of features (dot shapes) and a plurality of measuring lines, as illustrated in FIG. 1. A plurality of dots is arranged at random, for example, based on a predetermined probability (A %). Breaks are arranged on a measuring line so that an interval between adjacent breaks on the same line equals B+ΔB, where ΔB denotes a uniform random number generated in a range [−ϵ to ϵ], and ϵ denotes a fixed value specified by a user. Referring to the pattern 100 illustrated in FIG. 1, a background is illustrated in white and measuring lines are illustrated in black. Pattern light projects the background with low luminance, and projects measuring lines and dots with high luminance.

The image acquisition unit 220 acquires an image 700 (captured image) of the measurement target object 500 onto which the pattern 100 is projected, which is captured by the imaging apparatus 400.

The measuring line identification unit 230 identifies which measuring line on the pattern 100 is projected onto each measuring line observed on the image 700.

Based on the result of the measuring line identification by the measuring line identification unit 230, the search range setting unit 240 sets in the pattern 100 a possible range of the position on the pattern 100 corresponding to each pixel position on the image 700.

In the range set by the search range setting unit 240, the search unit 250 searches for a position on the pattern 100 corresponding to each pixel position on the image 700, and determines the position.

Based on the corresponding position determined by the search unit 250, the distance calculation unit 260 calculates a distance of the measurement target object 500 observed on each pixel on the image 700. The distance in this case refers to a distance from an optical center of the imaging apparatus 400 to the measurement target object 500.

Processing according to the present exemplary embodiment will be described below. FIG. 3 is a flowchart illustrating processing according to the present exemplary embodiment.

<Step S610>

The pattern acquisition unit 210 acquires an image of the pattern 100 and sends the image to the projection apparatus 300 via an interface (not illustrated). The projection apparatus 300 acquires a pattern from the pattern acquisition unit 210 and projects the acquired pattern on a space including the measurement target object 500. While the projection apparatus 300 is projecting the acquired pattern on a space including the measurement target object 500, the imaging apparatus 400 captures an image of the space.

<Step S620>

Figure 4A:
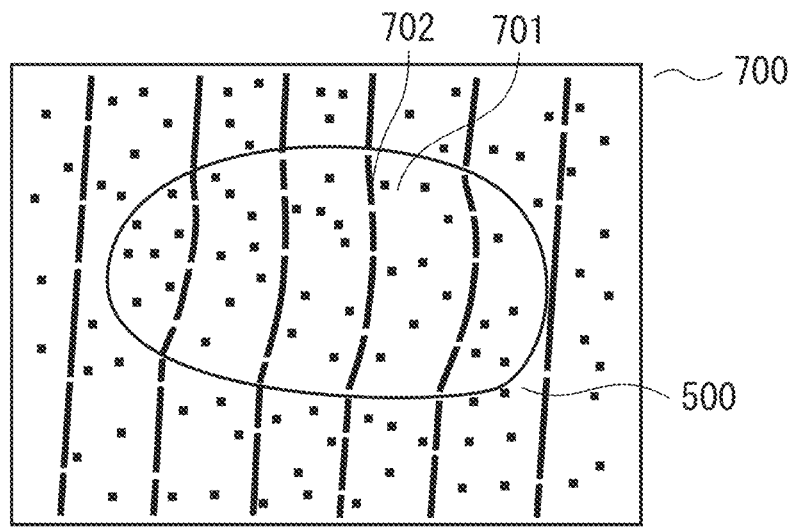
FIGS. 4A and 4B illustrate a range set by a search range setting unit according to the first exemplary embodiment.

The image acquisition unit 220 acquires an image 700 of the measurement target object 500 onto which the pattern 100 is projected in step S610, which is captured by the imaging apparatus 400. FIG. 4A illustrates an example of the acquired image 700.

<Step S630>

The measuring line identification unit 230 acquires the image 700 from the image acquisition unit 220 and identifies which measuring line on the pattern 100 is projected onto each measuring line observed on the image 700. The method for identifying a measuring line will be described in detail below.

First of all, the measuring line identification unit 230 detects a measuring line from the image 700. In detection of a measuring line, the measuring line identification unit 230 applies a Sobel filter to the image 700 to detect luminance extremal values (hereinafter referred to as detecting points) on the image 700, and performs labeling on adjacent detecting points to calculate them as a line on which adjacent detecting points are arranged. Each of detected measuring lines is represented by a measuring line i (i=1 to N), where N denotes the total number of detected measuring lines.

Then, based on the identification information 103 (breaks on measuring lines) included on the measuring line, the measuring line identification unit 230 identifies each of the detected measuring lines. An identification method using breaks on measuring lines is discussed, for example, in Japanese Patent Application Laid-Open No. 1-274007. More specifically, the measuring line identification unit 230 selects two breaks on the same line for each of measuring lines detected on the image 700 to calculate two epipolar lines on the pattern 100. Then, out of measuring lines on the pattern 100, the measuring line identification unit 230 determines a measuring line on the pattern 100 of which breaks coincide with the two epipolar lines. This identifies which measuring line on the pattern 100 is projected onto each measuring line detected on the image 700. The identification in this case refers to setting a number Li (Li=1 to M) representing an identifier (ID) of each measuring line on the pattern 100 corresponding to a measuring line i detected on the image 700, where M denotes the total number of measuring lines on the pattern 100. A measuring line on the pattern 100 to be set corresponding to the measuring line i detected on the image 700 is referred to as a measuring line Li.

<Step S640>

Based on the result of the measuring line identification by the measuring line identification unit 230, the search range setting unit 240 sets, with respect to each pixel position on the image 700 (a first region in the captured image), a possible range of the position on the image of the pattern 100 (a second region in the pattern 100) corresponding thereto.

Figure 4B:
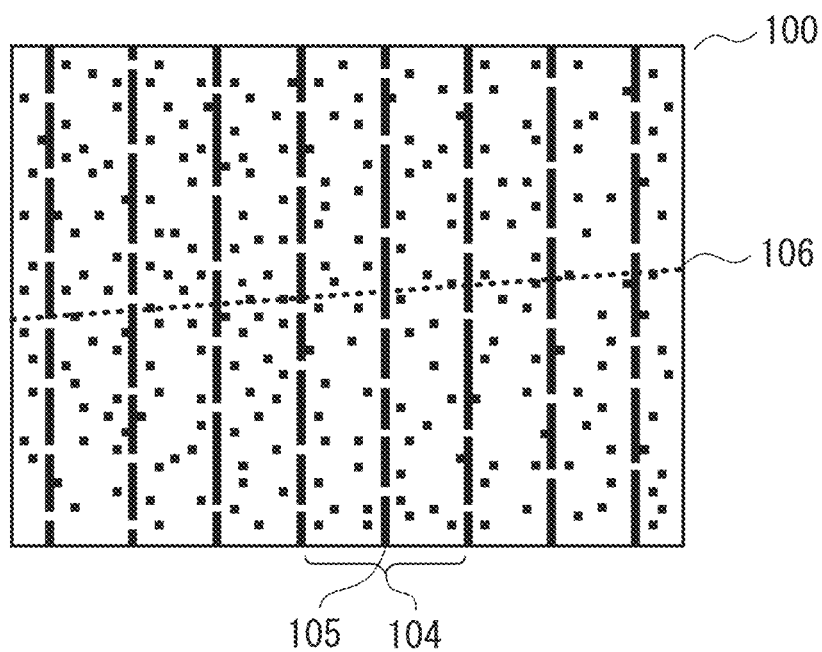

Processing in step S640 will be described below with reference to FIGS. 4A and 4B. First of all, the search range setting unit 240 selects one pixel from the image 700. The selected pixel is assumed to be a pixel k (a pixel 701 illustrated in FIG. 4A). Next, out of measuring lines identified by the measuring line identification unit 230, the search range setting unit 240 identifies the nearest neighbor measuring line i (a measuring line 702 illustrated in FIG. 4A) for the pixel k on the image 700.

Then, the search range setting unit 240 sets, with respect to the region of the pixel k, a possible range (a range 104 illustrated in FIG. 4B) of the region on the pattern 100 corresponding thereto as a range from S1 to S2, where S1 and S2 denote positions of measuring lines on the pattern 100 in a vertical direction. The search range setting unit 240 sets this range assuming that the region corresponding to the pixel k exists at the periphery of the measuring line Li (a measuring line 105 illustrated in FIG. 4B) corresponding to the measuring line i.

More specifically, assuming a position P(Li) of the measuring line Li as the center of the range, the search range setting unit 240 sets S1=P(Li)−ΔS and S2=P(Li)+ΔS, where P(Li) denotes a position of the measuring line Li on the pattern 100 in a vertical direction. In the present exemplary embodiment, ΔS=W is set, where W denotes an interval between adjacent measuring lines on the pattern 100. More specifically, assuming that a region corresponding to the pixel k shifts from the measuring line Li by up to the interval between measuring lines (W), the search range setting unit 240 sets a size of ΔS=W to cover the range.

Finally, the search range setting unit 240 calculates an epipolar line 106 on the pattern 100 for the position of the pixel k, and sets the range from S1 to S2 on the epipolar line 106 as a range of a corresponding point of the pixel k.

The search range setting unit 240 performs the above-described operation on different target pixels k on the image 700 to set a range for all pixels.

<Step S650>

In the range set by the search range setting unit 240, the search unit 250 searches, with respect to each pixel position on the image 700, for a pixel position on the image of the pattern 100 corresponding thereto. More specifically, the search unit 250 calculates a correlation between a block centering on the position of the target pixel k on the image 700 and blocks at different positions within the range from S1 to S2 on the epipolar line 106 on the pattern 100. Then, the search unit 250 determines the center position of a block having the highest correlation as the position of the pixel corresponding to the pixel k. The block Sum of Squared Difference (block SSD) is used for the correlation.

In the present exemplary embodiment, as described above, the search range setting unit 240 sets a search range on the pattern 100 to search for a region on the pattern 100 corresponding to each region in the captured image 700. On the contrary, however, the search unit 250 may set a search range in the captured image 700 and search for a region in the captured image 700 corresponding to each region on the pattern 100.

<Step S660>

Based on the result of the search by the search unit 250, the distance calculation unit 260 calculates a distance of the measurement target object 500 observed on each pixel on the above-described image 700.

More specifically, based on the pixel k on the image 700 and the corresponding pixel position on the image of the pattern 100 determined by the search unit 250, the distance calculation unit 260 calculates the distance based on the triangulation principle.

The distance calculation unit 260 performs the above-described operation on different target pixels k on the image 700 to calculate the distance for all pixels.

As described above, according to the present exemplary embodiment, the information processing apparatus 200 first identifies a measuring line on an image subjected to measurement target object observation. Then, based on the result of the measuring line identification, the information processing apparatus 200 narrows a search range for acquiring the correspondence between the image 700 and the pattern 100 to reduce the time for a search. Thus, a three-dimensional shape of the measurement target object can be measured at high speed.

In the present exemplary embodiment, the projection apparatus 300 may be an apparatus of any type as long as it projects a two-dimensional pattern. For example, the projection apparatus 300 may be a document projector which projects a two-dimensional image, or an apparatus which combines a light source and a mask pattern. Further, the pattern to be projected may be a grayscale pattern or a color pattern. In case of a projection apparatus in which a mask pattern is set, since the pattern is physically set in the projection apparatus, it is not necessary to supply a pattern from the pattern acquisition unit 210 at the time of measurement. Pattern light projected the background with low luminance and projected measuring line and dots with high luminance. However, pattern light may project a pattern of any type as long as the measuring line and a background of the pattern are observed with different luminance values, and a pattern feature is observed on the image with signals different from the measuring line. Of the pattern 100, measuring lines and dots may be projected with low luminance and the background may be projected with high luminance. Variations of a feature will be described in a second modification. A pattern may be acquired from a storage area (not illustrated) included in the information processing apparatus 200 or from an external information sources via a network. The storage area may be a hard disk or a RAM.

An image acquired by the image acquisition unit 220 is a two-dimensional image of any type, for example, a grayscale image or a color image. An image may be acquired directly from the imaging apparatus 400, or may be once stored in a memory and then acquired afterwards.

The search unit 250 may use any kind of method for calculating a correlation between blocks as long as the method calculates a degree of similarity between blocks, for example, SSD as described in the present exemplary embodiment or Sum of Absolute Difference (SAD). Blocks subjected to correlation calculation may be in any shape, for example, a rectangle or a circle.

In the first exemplary embodiment, the distance calculation unit 260 outputs a distance value for pixels of which correspondence is acquired through block matching. However, the distance calculation unit 260 may further calculate a distance value of points on a measuring line identified by the measuring line identification unit 230 by using the principle of the photo cutting method based on the result of the measuring line identification, and output the calculated distance value separately from the distance value acquired through block matching.

The search range setting unit 240 and the distance calculation unit 260 may perform processing for setting a search range and processing for calculating a distance, respectively, by using any calculation methods as long as the methods perform calculations on a position of at least one pixel on the image 700. These units may perform calculations on all pixels on the image 700 or on pixels on the image 700 set at predetermined sampling intervals.

According to the present exemplary embodiment, the search range setting unit 240 sets a range of the pixel position on the image of the pattern 100 corresponding to each pixel position on the image 700 based on the result of the measuring line identification. The search unit 250 searches for a pixel position on the pattern 100 corresponding to each pixel position on the image 700. Then, the distance calculation unit 260 acquires a correspondence between the image 700 and the pattern 100 and calculates a distance based on the triangulation principle.

In contrast to the above-described method, the processing may also be performed in the following way. First of all, based on the result of the measuring line identification, the search range setting unit 240 sets a range of the pixel position on the image 700 corresponding to each pixel position on the pattern 100. Then, the search unit 250 searches for a pixel position on the image 700 corresponding to each pixel position on the image of the pattern 100 to acquire a corresponding positional relationship between the image 700 and the pattern 100. The distance calculation unit 260 calculates a distance based on the triangulation principle. In this case, the method based on each pixel on the image 700 according to the first exemplary embodiment is replaced with a method based on each pixel position on the image of the pattern 100. More specifically, the search unit 250 selects the nearest neighbor measuring line on the pattern 100 for a target pixel position on an image of the pattern 100, and performs search in a range at the periphery of the measuring line on the image 700 corresponding to the selected measuring line to acquire a corresponding positional relationship between the image 700 and the image of the pattern 100. Although, in the present exemplary embodiment, the corresponding positional relationship between the image 700 and the image of the pattern 100 is acquired on the premise that the pattern 100 has an image format, the pattern 100 does not need to have an image format and may have a predetermined data format.

A first modification will be described below focusing on variations of the method for searching for a search range performed by the search range setting unit 240.

The search range setting unit 240 may use any kind of method for setting a range as long as the method sets a possible range of a position on the pattern 100 corresponding to each pixel position on the image 700 based on the result of the measuring line identification by the measuring line identification unit 230.

As described in the first exemplary embodiment, the search range setting unit 240 may set as a range an interval having a predetermined length ΔS by using as a reference position S the position of the measuring line Li on the pattern 100 corresponding to the nearest neighbor measuring line i for the position of the target pixel k on the image 700.

The processing may also be performed in the following way. Instead of using one neighbor measuring line for the position of the target pixel k on the image 700, the search range setting unit 240 calculates a plurality of measuring lines existing in a predetermined region centering on the target position on the image 700. Then, the search range setting unit 240 sets as a range ΔS an interval having a predetermined length by using as a reference position S the average value of the positions of measuring lines on the pattern 100 corresponding to the respective measuring lines on the image 700.

The interval ΔS from a reference position on the pattern 100 may be an interval between adjacent measuring lines on the pattern 100, as described in the first exemplary embodiment. The interval ΔS may be a predetermined value set by a user, or a setting value which increases with a difference X between the position of the target pixel k and the position of a neighbor measuring line on the image 700.

The processing may also be performed in the following way. Instead of setting as a range a predetermined length from a certain reference position on the pattern 100, the search range setting unit 240 calculates a plurality of measuring lines existing in a predetermined region for the target pixel k on the image 700, calculates the positions of measuring lines on the pattern 100 corresponding to the respective measuring lines on the image 700 and sets maximum and minimum values of the relevant positions as a range.

Further, based on the relationship between the position of the target pixel k on the image 700 and the position of the nearest neighbor measuring line i, the search range setting unit 240 may calculate which side of the measuring line Li on which the position on the pattern 100 corresponding to the pixel k exists, and set a range based on the side. For example, in the example illustrated in FIG. 4A, the position of the target pixel k on the image 700 is assumed to be on the right-hand side with respect to the direction of the measuring line i. In this case, the direction of the measuring line i is defined to be the upward direction on the pattern 100. The position on the pattern 100 corresponding to the pixel k can be presumed to exist on the right-hand side of the measuring line Li on the pattern 100. Therefore, when a range from S1 to S2 is set, the search range setting unit 240 may set S1=P(Li) and S2=P(Li)+ΔS and may exclude one side of the position P(Li) of the measuring line Li from the search range.

Furthermore, as illustrated in the first exemplary embodiment, the range set by the search range setting unit 240 may be limited to the epipolar line at the target position on the image 700, and the search range setting unit 240 may search for a range other than the epipolar line.

As described above, the search range setting unit 240 may use any kind of method for setting a range as long as the method sets a possible range of a position on the pattern 100 corresponding to each pixel position on the image 700 based on the result of the measuring line identification by the measuring line identification unit 230.

A second modification will be described below focusing on variations of the method for calculating a correspondence between the image 700 and the pattern 100 performed by the search unit 250.

According to the first exemplary embodiment, in calculation of the correspondence between the image 700 and the pattern 100, the search unit 250 searches for a block on the pattern 100 having a high correlation with each pixel block on the image 700, in a range set by the search range setting unit 240. This means searching for the correspondence based on image information in each block.

In addition to the above-described method, the search unit 250 may use any kind of method for searching for the correspondence between the image 700 and pattern 100 as long as the method searches for a position on the pattern 100 corresponding to the target position on the image 700, in a range set by the search range setting unit 240. For example, the search unit 250 may detect each of elements of features (hereinafter referred to as feature elements) of the pattern 100 observed on the image 700 and search for a position of feature element on the pattern 100 corresponding to each detected element position, in a range set by the search range setting unit 240. This means that the search unit 250 acquires a correspondence focusing on pixel positions occupied by feature elements of the pattern 100. When using this method, the search unit 250 first detects pixel positions of feature elements of the pattern 100, i.e., dot pixel positions in the first exemplary embodiment, on the image 700. The dot pixel position can be calculated by calculating an extremal value having a higher luminance value than surrounding pixels for each pixel on the image 700. Then, the search unit 250 makes the pixel positions of feature elements detected on the image 700 correspond to the pixel positions of feature elements of the pattern 100. In this case, in a range set by the search range setting unit 240, the search unit 250 searches for a dot on the pattern 100 on the epipolar line on the pattern 100 corresponding to the pixel position of each dot detected on the image 700. More specifically, the search unit 250 determines that the nearest neighbor dot for a line segment of the epipolar line in the range on the pattern 100 corresponds to the position of each dot detected on the image 700. In this case, the search unit 250 utilizes the fact that the dot corresponding to the position of each dot detected on the image 700 exists on the epipolar line. Based on the corresponding positions between the image 700 and the pattern 100 acquired in the above-described processing, the distance calculation unit 260 calculates the distance by using the triangulation principle.

As described above, the search unit 250 calculates the correspondence between the image 700 and the pattern 100 by using any kind of method as long as the method calculates the position on the pattern 100 corresponding to each position on the image 700, in a range set by the search range setting unit 240. The search unit 250 may use a method for searching for corresponding positions based on image correlations or a method for searching for corresponding positions based on feature positions on the pattern 100.

A third modification will be described below focusing on variations of a pattern feature acquired by the pattern acquisition unit 210.

Figure 5A:
FIGS. 5A, 5B, and 5C illustrate variations of a pattern feature according to a second modification.
Figure 5B:
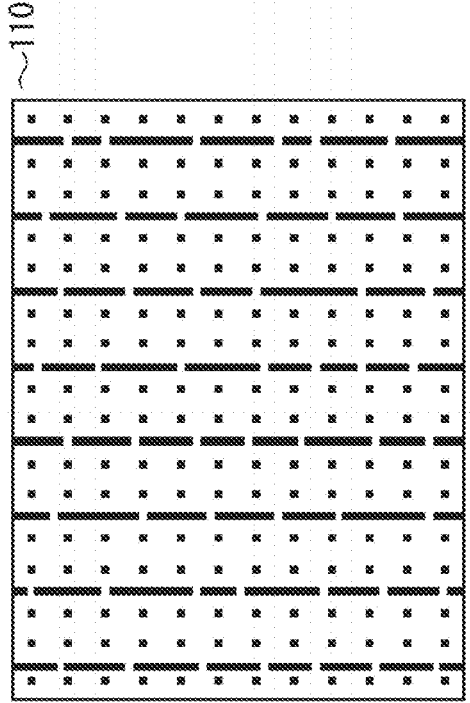
Figure 5C:
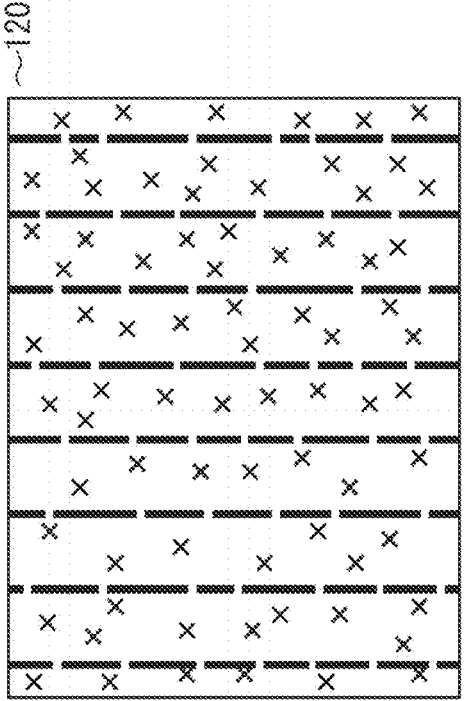

A pattern feature of any type may be used as long as a feature is observed on an image with a signal different from a measuring line, i.e., as long as a feature is not solid-colored. More specifically, as described above in the first exemplary embodiment, features include a plurality of feature elements. Feature elements may be dots arranged at random or dots arranged at equal intervals, as in a pattern 110 illustrated in FIG. 5A. Further, feature elements are not necessarily dots but features, as in a pattern 120 illustrated in FIG. 5B. Furthermore, feature colors may be uniformly changed or a different color may be set for each part of the pattern 100. A pattern does not necessarily include a plurality of feature elements such as dots but may include features having luminance variations, as in a pattern 130 illustrated in FIG. 5C. Whichever features are used, taking a correlation between features at positions on the epipolar line on the pattern 100 and each position on the image 700 enables calculating corresponding positions on the pattern 100.

As described above, a pattern feature of any type is applicable as long as the feature can be observed on the image 700 with a signal different from a measuring line.

A fourth modification will be described below focusing on variations of the method for identifying a measuring line performed by the measuring line identification unit 230.

The measuring line identification unit 230 may use any kind of method for identifying a measuring line as long as the method enables detecting and identifying a measuring line on the image 700.

The measuring line identification unit 230 may use any kind of method for identifying a measuring line as long as the method enables extracting a position of a measuring line observed on the image 700 in a labeled state. A measuring line may be detected by labeling an edge detected by using a Sobel filter, or by thinning an image formed through binarization with a predetermined threshold value.

Figure 6A:
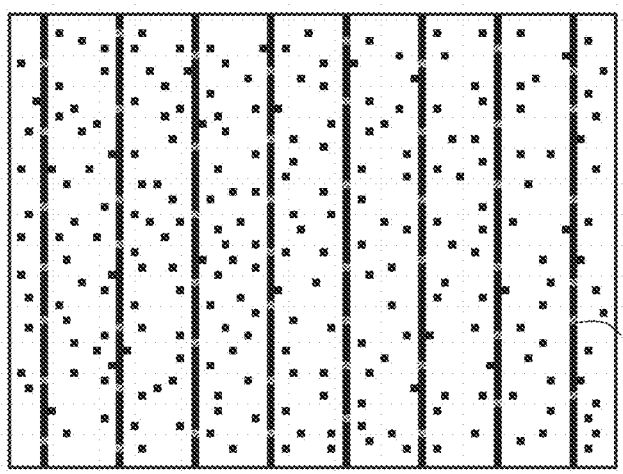
FIGS. 6A and 6B illustrate variations of pattern identification information according to a fourth modification.
Figure 6B:
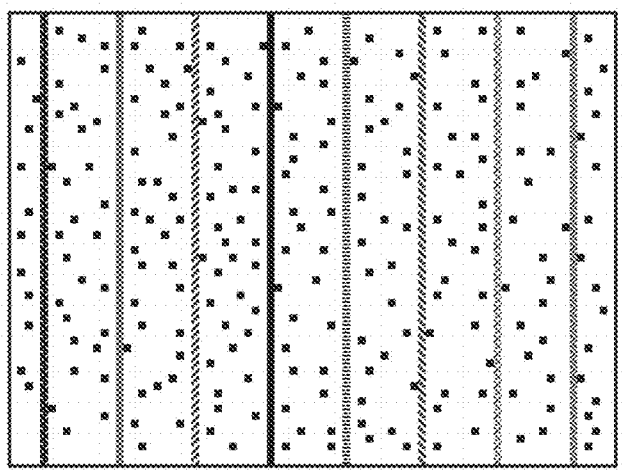

The measuring line identification unit 230 may use any kind of method for identifying the detected measuring line as long as the method enables identifying which measuring line on the pattern 100 is projected onto each measuring line observed on the image 700. Further, the measuring line identification unit 230 may use any kind of identification information as long as the identification information enables identifying a measuring line. For example, as illustrated in the first exemplary embodiment, breaks may be provided at random on a measuring line as identification information, and a measuring line may be identified based on positions of breaks observed on the image 700. Furthermore, at least one of the luminance, color, and shape of a part of a measuring line may be changed so that the relevant position serves as a sign, and the measuring line may be identified based on the position of the sign observed on the image 700. For example, as in a pattern 140 illustrated in FIG. 6A, a sign 141 (illustrated in FIG. 6A) having a different luminance value may be arranged on a measuring line as identification information. A sign may be arranged not on a line but between lines. As in a pattern 150 illustrated in FIG. 6B, measuring lines 151 (illustrated in FIG. 6B) having different colors may be projected as identification information, and measuring lines may be identified based on colors of measuring lines observed on the image 700. Not the color of measuring lines but the color between lines may be changed. The luminance value on a measuring line may also be changed, and a measuring line may be identified based on change in luminance on the measuring line observed on the image 700.

As described above, the measuring line identification unit 230 may use any kind of method for identifying a measuring line as long as the method enables detecting and identifying a measuring line on the image 700.

Embodiments of the present disclosure can also be realized by a computer of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, an information processing apparatus first identifies a measuring line on an image subjected to measurement target object observation. Then, based on the result of the measuring line identification, the information processing apparatus sets a search range for acquiring a correspondence between an image and a pattern to reduce the time for a search. Thus, a three-dimensional shape of the measurement target object can be measured at high speed.

In the present exemplary embodiment, the pattern acquisition unit 210 may acquire a pattern of any type as long as the pattern includes features, at least one measuring line, and identification information for identifying a measuring line observed on the image 700. A feature may be of any type as long as a feature is observed with a signal different from a measuring line on the image 700. For example, the feature may include a plurality of dots or may include luminance variations on the pattern 100. The identification information may be of any type as long as the information enables identifying a measuring line observed on the image 700. A Sign may be arranged on or between measuring lines, and may be used as identification information. The color on or between measuring lines may be used as identification information.

An image acquired by the image acquisition unit 220 is a two-dimensional image of any type, for example, a grayscale image or a color image. An image may be acquired directly from the imaging apparatus 400, or may be once stored in a memory and then acquired afterwards.

The measuring line identification unit 230 may use any kind of method for identifying a measuring line as long as the method detects and identifies a measuring line on the image 700. Breaks on a measuring line as identification information may be of any type as long as the information enables identifying a measuring line observed on the image 700. When breaks on a measuring line are used as identification information, a measuring line may be identified based on positions of breaks on the measuring line observed on the image 700. When colors of a measuring line are used as identification information, a measuring line may be identified based on colors of the measuring line observed on the image 700.

The search range setting unit 240 may use any kind of method for setting a range as long as the method sets a possible range of the position on the pattern 100 corresponding to each pixel position on the image 700 based on the result of the measuring line identification by the measuring line identification unit 230. The search range setting unit 240 may set a range based on the result of the identification of the nearest neighbor measuring line for the target position on the image 700, or based on the result of the identification of a measuring line in a predetermined region for the target position on the image 700. In contrast to the above-described method, the search range setting unit 240 may use a method for setting a possible range of the position on the image 700 corresponding to each pixel position on the pattern 100.

The distance calculation unit 260 uses a distance calculation method to calculate the correspondence between the image 700 and the pattern 100, and to calculate the distance based on the triangulation principle. The search unit 250 may use any kind of method for calculating the correspondence between the image 700 and the pattern 100 as long as the method searches for a position on the pattern 100 corresponding to the target position on the image 700, in a range set by the search range setting unit 240. The search unit 250 may acquire the correspondence through block matching in a range on the pattern 100. When a pattern feature include a plurality of feature elements, the search unit 250 may detect feature elements observed on the image 700 and then search for the feature element corresponding to the position of each feature element in a search range on the pattern 100, thus acquiring the correspondence.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2014-184466, filed Sep. 10, 2014, which is hereby incorporated by reference herein in its entirety.

What is claimed is:

1. An information processing apparatus comprising:
one or more memories that store a set of instructions; and
one or more processors that execute the instructions to:
acquire a captured image captured by an imaging apparatus in a state where a pattern is projected onto a measurement target object, the pattern including a plurality of lines, identification information arranged on or between the lines to identify the lines, and a feature arranged between the plurality of lines;
identify each line included in the captured image by acquiring a correspondence between each line included in the projected pattern and each line included in the captured image, based on the identification information included in the captured image;
determine a second region in the pattern corresponding to a first region between the lines in the captured image based on a result of the identification; and
derive a distance of the measurement target object by acquiring a correspondence between the first region and the second region.

2. The information processing apparatus according to claim 1, wherein the one or more processors execute the instructions to set, in the pattern, a search range for searching the second region in the pattern corresponding to the first region between the lines in the captured image based on the result of the identification,
wherein, based on the feature arranged between the plurality of lines included in the captured image, the one or more processors execute the instructions to determine the second region corresponding to the first region by searching the search range set in the pattern.

3. The information processing apparatus according to claim 2, wherein the one or more processors execute the instructions to detect a first line which is a nearest neighbor line for the first region in the captured image, and
identify a line corresponding to the first line from within the pattern based on the result of the identification, and set the search range in the vicinity of the identified line.

4. The information processing apparatus according to claim 3, wherein the one or more processors execute the instructions to set the search range on one side of the first line, in the vicinity of the identified line, on which the first region exists on the captured image.

5. The information processing apparatus according to claim 2, wherein the one or more processors execute the instructions to calculate a correlation between the region included in the set search range and the first region, and determine the second region based on the calculated correlation.

6. The information processing apparatus according to claim 1, wherein the first region is a region of each pixel on the captured image or a region of a plurality of pixels on the captured image.

7. The information processing apparatus according to claim 1, wherein the first region is a region of pixels occupied by a pattern feature included in the captured image.

8. The information processing apparatus according to claim 1, wherein the identification information included in the pattern is a break of a line included in the pattern.

9. The information processing apparatus according to claim 1, wherein the identification information included in the pattern is at least one of a color and a luminance on the lines and a color and a luminance between the lines included in the pattern.

10. The information processing apparatus according to claim 1, wherein the feature included in the pattern is a dot shape.

11. An information processing apparatus comprising:
one or more memories that store a set of instructions; and
one or more processors that execute the instructions to:
acquire a captured image captured by an imaging apparatus in a state where a pattern is projected onto a measurement target object, the pattern including a plurality of lines, identification information arranged on or between the lines to identify the lines, and a feature arranged between the plurality of lines;
identify each line included in the captured image by acquiring a correspondence between each line included in the projected pattern and each line included in the captured image, based on the identification information included in the captured image;
determine a second region in the captured image corresponding to a first region between the lines in the pattern based on a result of the identification; and
derive a distance of the measurement target object by acquiring a correspondence between the first region and the second region.

12. The information processing apparatus according to claim 11, wherein the one or more processors execute the instructions to set, in the captured image, a search range for searching the second region in the captured image corresponding to the first region between the lines in the pattern based on the result of the identification,
wherein, based on the feature arranged between the plurality of lines included in the pattern, the one or more processors execute the instructions to determine the second region corresponding to the first region by searching the search range set in the pattern.

13. An information processing apparatus comprising:
one or more memories that store a set of instructions; and
one or more processors that execute the instructions to:
acquire a captured image captured by an imaging apparatus in a state where a pattern is projected onto a measurement target object, the pattern including a plurality of broken lines of which respective regions are partly masked, and a feature arranged between the plurality of broken lines;
identify each of a plurality of broken lines included in the captured image by acquiring a correspondence between the plurality of broken lines included in the projected pattern and the plurality of broken lines included in the captured image, based on positions of the masked regions included in the captured image;
determine a second region in the pattern corresponding to a first region between the plurality of broken lines in the captured image based on a result of the identification; and
derive a distance of the measurement target object by acquiring a correspondence between the first region and the second region.

14. The information processing apparatus according to claim 13, wherein the one or more processors execute the instructions to set, in the pattern, a search range for searching the second region in the pattern corresponding to the first region between the lines in the captured image based on the result of the identification,
wherein, based on the feature arranged between the plurality of lines included in the captured image, the one or more processors execute the instructions to determine the second region corresponding to the first region by searching the search range set in the pattern.

15. An information processing apparatus comprising:
one or more memories that store a set of instructions; and
one or more processors that execute the instructions to:
acquire a captured image captured by an imaging apparatus in a state where a pattern is projected onto a measurement target object, the pattern including a plurality of broken lines of which respective regions are partly masked, and a feature arranged between the plurality of broken lines;
identify each of a plurality of broken lines included in the captured image by acquiring a correspondence between the plurality of broken lines included in the projected pattern and the plurality of broken lines included in the captured image, based on positions of the masked regions included in the captured image;
determine a second region in the captured image corresponding to a first region between the broken lines in the pattern based on a result of the identification; and
derive a distance of the measurement target object by acquiring a correspondence between the first region and the second region.

16. The information processing apparatus according to claim 15, wherein the one or more processors execute the instructions to set, in the captured image, a search range for searching the second region in the captured image corresponding to the first region between the lines in the pattern based on the result of the identification,
wherein, based on the feature arranged between the plurality of lines included in the pattern, the one or more processors execute the instructions to determine the second region corresponding to the first region by searching the search range set in the pattern.

17. An information processing method comprising:
acquiring a captured image captured by an imaging apparatus in a state where a pattern is projected onto a measurement target object, the pattern including a plurality of lines, identification information arranged on or between the lines to identify the lines, and a feature arranged between the plurality of lines;
identifying each line included in the captured image by acquiring a correspondence between each line included in the projected pattern and each line included in the captured image, based on the identification information included in the captured image;

determining a second region in the pattern corresponding to a first region between the lines in the captured image based on a result of the identification; and deriving a distance of the measurement target object by acquiring a correspondence between the first region and the determined second region.

18. An information processing method comprising:

acquiring a captured image captured by an imaging apparatus in a state where a pattern is projected onto a measurement target object, the pattern including a plurality of lines, identification information arranged on or between the lines to identify the lines, and a feature arranged between a plurality of the lines;

identifying each line included in the captured image by acquiring a correspondence between each line included in the projected pattern and each line included in the captured image, based on the identification information included in the captured image;

determining a second region in the captured image corresponding to a first region between the lines in the pattern based on a result of the identification; and deriving a distance of the measurement target object by acquiring a correspondence between the first region and the determined second region.

19. An information processing method comprising:

acquiring a captured image captured by an imaging apparatus in a state where a pattern is projected onto a measurement target object, the pattern including a plurality of broken lines of which respective regions are partly masked, and a feature arranged between a plurality of the broken lines;

identifying each of a plurality of broken lines included in the captured image by acquiring a correspondence between the plurality of broken lines included in the projected pattern and the plurality of broken lines included in the captured image, based on positions of the masked regions included in the captured image;

determining a second region in the pattern corresponding to a first region between the plurality of broken lines in the captured image based on a result of the identification; and deriving a distance of the measurement target object by acquiring a correspondence between the first region and the determined second region.

20. An information processing method comprising:

acquiring a captured image captured by an imaging apparatus in a state where a pattern is projected onto a measurement target object, the pattern including a plurality of broken lines of which respective regions are partly masked, and a feature arranged between the plurality of broken lines;

identifying each of a plurality of broken lines included in the captured image by acquiring a correspondence between the plurality of broken lines included in the projected pattern and the plurality of broken lines included in the captured image, based on positions of the masked regions included in the captured image;

determining a second region in the captured image corresponding to a first region between the broken lines in the pattern based on a result of the identification; and deriving a distance of the measurement target object by acquiring a correspondence between the first region and the determined second region.

21. A non-transitory recording medium storing a program for causing a computer to:

acquire a captured image captured by an imaging apparatus in a state where a pattern is projected onto a measurement target object, the pattern including a plurality of lines, identification information arranged on or between the lines to identify the lines, and a feature arranged between the plurality of lines;

identify each line included in the captured image by acquiring a correspondence between each line included in the projected pattern and each line included in the captured image, based on the identification information included in the captured image;

determine a second region in the pattern corresponding to a first region between the lines in the captured image based on a result of the identification; and derive a distance of the measurement target object by acquiring a correspondence between the first region and the second region.

22. A non-transitory recording medium storing a program for causing a computer to:

acquire a captured image captured by an imaging apparatus in a state where a pattern is projected onto a measurement target object, the pattern including a plurality of lines, identification information arranged on or between the lines to identify the lines, and a feature arranged between the plurality of lines;

identify each line included in the captured image by acquiring a correspondence between each line included in the projected pattern and each line included in the captured image, based on the identification information included in the captured image;

determine a second region in the captured image corresponding to a first region between the lines in the pattern based on a result of the identification; and derive a distance of the measurement target object by acquiring a correspondence between the first region and the second region.

23. A non-transitory recording medium storing a program for causing a computer to:

acquire a captured image captured by an imaging apparatus in a state where a pattern is projected onto a measurement target object, the pattern including a plurality of broken lines of which respective regions are partly masked, and a feature arranged between the plurality of broken lines;

identify each of a plurality of broken lines included in the captured image by acquiring a correspondence between the plurality of broken lines included in the projected pattern and the plurality of broken lines included in the captured image, based on positions of the masked regions included in the captured image;

determine a second region in the pattern corresponding to a first region between the plurality of broken lines in the captured image based on a result of the identification; and derive a distance of the measurement target object by acquiring a correspondence between the first region and the second region.

24. A non-transitory recording medium storing a program for causing a computer to:

acquire a captured image captured by an imaging apparatus in a state where a pattern is projected onto a measurement target object, the pattern including a plurality of broken lines of which respective regions are partly masked, and a feature arranged between the plurality of broken lines;

identify each of a plurality of broken lines included in the captured image by acquiring a correspondence between the plurality of broken lines included in the projected pattern and the plurality of broken lines included in the captured image, based on positions of the masked regions included in the captured image;

determine a second region in the captured image corresponding to a first region between the broken lines in the pattern based on a result of the identification; and derive a distance of the measurement target object by acquiring a correspondence between the first region and the second region.

* * * * *